US008040016B2

(12) United States Patent
Fournier et al.

(10) Patent No.: US 8,040,016 B2
(45) Date of Patent: Oct. 18, 2011

(54) COMMUTATOR BRUSH WITH IMPROVED CONTACT AND NON-CONTACT ZONES

(75) Inventors: Eric Fournier, Etival les le Mans (FR); Florence Campagne, Thorigne En Charnie (FR); Maurad Berkouk, Le Conquel (FR)

(73) Assignee: Brose Fahrzeugteile GmbH & Co., Wurzburg (DE)

( * ) Notice: Subject to any disclaimer, the term of this patent is extended or adjusted under 35 U.S.C. 154(b) by 0 days.

(21) Appl. No.: 12/087,693

(22) PCT Filed: Dec. 13, 2006

(86) PCT No.: PCT/EP2006/011995

§ 371 (c)(1),
(2), (4) Date: Jan. 2, 2009

(87) PCT Pub. No.: WO2007/079892

PCT Pub. Date: Jul. 19, 2007

(65) Prior Publication Data

US 2009/0152978 A1 Jun. 18, 2009

(30) Foreign Application Priority Data

Jan. 11, 2006 (FR) ..................................... 06 00223

(51) Int. Cl.
*H02K 13/00* (2006.01)
*H01R 39/20* (2006.01)
*H01R 39/24* (2006.01)
*H01R 39/40* (2006.01)

(52) U.S. Cl. ........ 310/251; 310/243; 310/244; 310/248; 310/249; 310/252; 310/245; 310/253

(58) Field of Classification Search .................. 310/248, 310/244, 233, 245, 253, 252, 251, 249
See application file for complete search history.

(56) References Cited

U.S. PATENT DOCUMENTS 5,485,049 A * 1/1996 Shannon et al. .............. 310/248
5,594,290 A 1/1997 Shannon et al.
5,909,077 A 6/1999 Bruhn et al.
6,528,923 B2 * 3/2003 Katoh et al. ................. 310/251
(Continued)

FOREIGN PATENT DOCUMENTS

DE 10355813 6/2005
(Continued)

OTHER PUBLICATIONS

French Office Action dated Sep. 19, 2006.
International Search Report and Written Opinion dated Apr. 11, 2007.

*Primary Examiner* — Quyen Leung
*Assistant Examiner* — Terrance Kenerly
(74) *Attorney, Agent, or Firm* — Jenkins, Wilson, Taylor & Hunt P.A.

(57) ABSTRACT

The present invention relates to a brush 10 suitable for coming into contact with conducting plates 12 provided on an electric motor commutator 11. According to the invention, the brush has a means 15 for adjusting its pole coverage between the start of life of the motor and its stabilized operation. This is therefore a brush with pole coverage that can be varied over its operating life. Such a brush is more particularly fitted into a motor for a ventilation (air conditioning) system for motor vehicle.

6 Claims, 2 Drawing Sheets

U.S. PATENT DOCUMENTS

| | | | | |
|---|---|---|---|---|
| 6,700,291 | B2 * | 3/2004 | Uchida et al. | 310/239 |
| 6,750,585 | B2 * | 6/2004 | You | 310/239 |
| 7,514,836 | B2 * | 4/2009 | Berghanel et al. | 310/239 |
| 2005/0121995 | A1 * | 6/2005 | Nakajima et al. | 310/239 |
| 2005/0156478 | A1 * | 7/2005 | Berghanel et al. | 310/242 |

FOREIGN PATENT DOCUMENTS

| | | | |
|---|---|---|---|
| GB | 813 649 | A | 5/1959 |

* cited by examiner

Fig 5
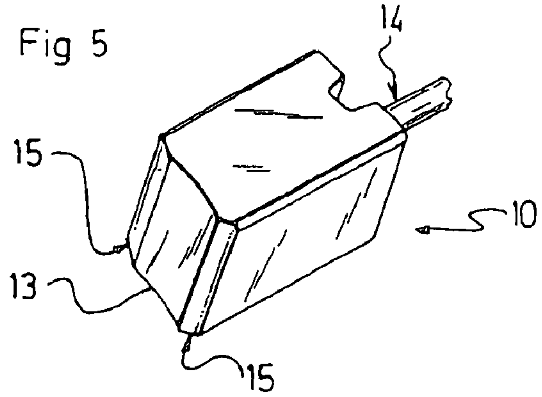
Fig 6
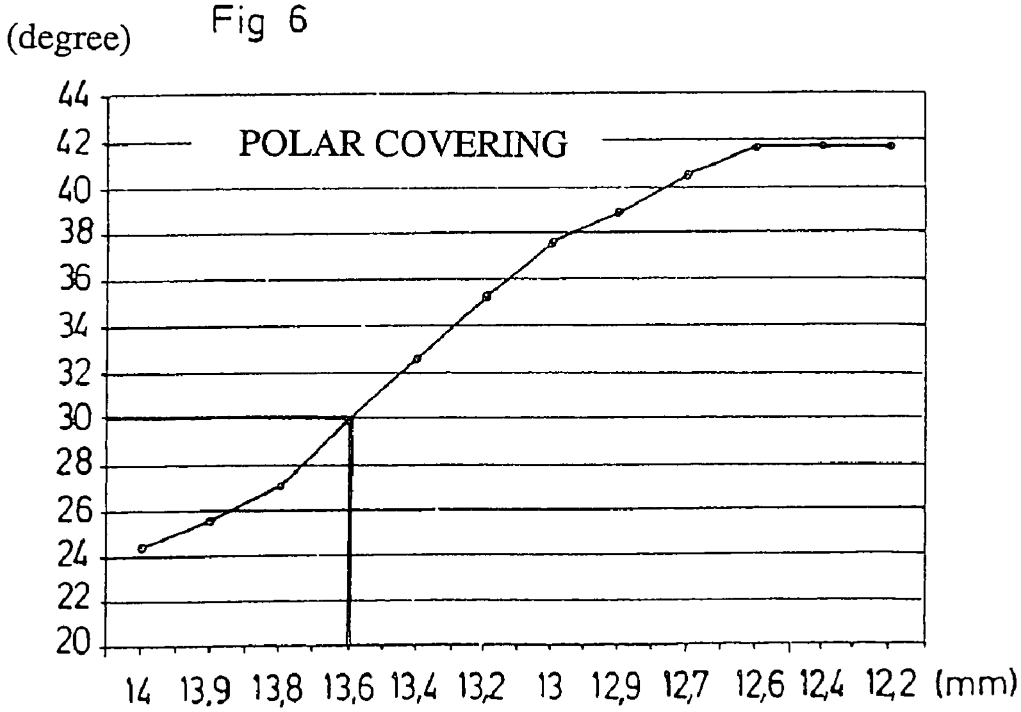
Fig 7
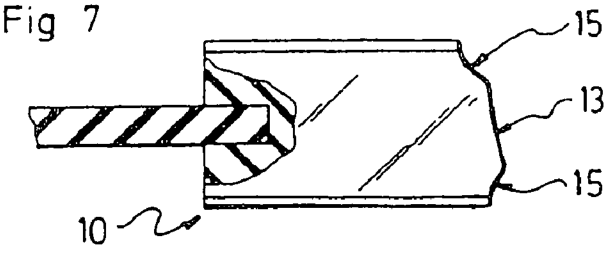
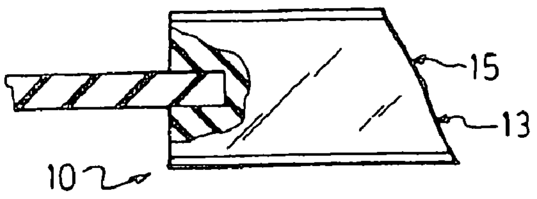
Fig 8a
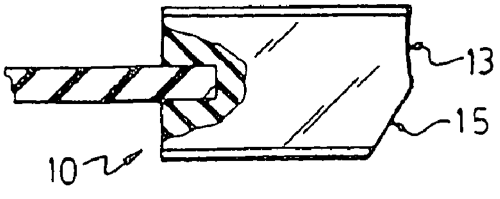
Fig 8b

COMMUTATOR BRUSH WITH IMPROVED CONTACT AND NON-CONTACT ZONES

TECHNICAL FIELD

The present invention relates to electric motor brushes. It concerns particularly electric motors used in ventilation systems for motor vehicles.

BACKGROUND

The electric motors generally used for the ventilation systems (air condition) of motor vehicles usually comprise a stator and a rotor. The commutator of the rotor is provided with contact plates resp. sections (generally made of machined copper) adapted to ensure an electric contact with brushes made of graphite (also called carbon brush). These brushes are attached to the stator.

To ensure a good electric contact between the commutator and the brushes it is well known that the brushes have to be pushed against the commutator by applying a sufficient pressure on them. If the contact is not adequate, the brushes can cause skips which in this way intermittently interrupt the electric contact. This results generally in sparks. By contrast if the contact is too strong the mechanical losses will increase as well as temperature and wear and tear. To this end the brushes are usually arranged in brush holders equipped with resilient means to maintain an electric contact between the brushes and the commutator.

In a well known manner the commutator has a rotation cylinder shape and supports a plurality of conductive plates resp. sections on its external periphery. The brushes are radially arranged around the commutator and comprise contact surfaces with the commutator sections. Brushes usually cover two or three commutator sections.

The brushes cover three commutator sections, if their rim width resp. polar or central angle is greater than 360°/P (with P=number of commutator sections). If the commutator comprises 12 sections, the brush covers three sections when the rim width angle has a value of more than 30°. This configuration has the disadvantage of generating noise, in particular during the initial working hours. This basically involves the incertainty of commutation (random contact point between the brush and the commutator section). After some working hours a patina constituted of a deposit generally containing metal (and its oxides), carbon and water will form on the commutator surface. Said patina tends to increase the motor function noise. However, this patina will form only after some motor working hours. Therefore this type of motor generates too much noise during its initial working hours, which is not compatible with its arrangement in a passenger compartment of a motor vehicle.

The brushes cover two commutator sections if their rim width angle resp. polar angle is in the range of 360°/P (with P=number of commutator sections). Said brushes have the advantage of generating less noise during the initial working hours, but present the characteristic of increasing the temperature level. To dissipate the heat the friction area with the commutator has been extended, but this results in a modification of the required space of the brushes.

SUMMARY

The present invention is directed to reduce noise of the electromagnetic and mechanic motor functions between the initial working hours or running-in period of the motor and the stabilized operational condition without altering the installation space of the brushes.

To this end the present invention provides a brush adapted to contact the conductive plates arranged on a commutator of an electric motor, the brush being characterized in that it comprises a polar covering control means between the beginning of the motor lifespan and its condition of stabilized operation.

Thus by realizing a brush comprising a polar covering being evolutive during the motor lifespan it is possible at the same time:

- to reduce the motor noise during the running-in period, because
  - friction is reduced;
  - formation of the patina is accelerated (as the current density is increased); and
  - multiple commutation associated with mutual inductances is reduced, even suppressed, and
- to approach temperature levels being equivalent to prior configurations during condition of stabilized operation.

According to the invention the polar covering control means is dependent on the brush width at the level of its contact zone with the commutator.

Advantageously the variable polar covering is obtained by realization of at least one zone formed with a limited width at a periphery of a contact zone with the commutator plates, the said formed zone being adapted to reduce the polar covering of the brush during the running-in period of the motor and to secure a polar covering determined to a stabilized motor operation.

According to a preferred embodiment it is preferable that the control means comprise two formed (chamfered) zones formed in both sides of the contact zone between the brush and the commutator. For that reason the contact surface between the commutator and the brush extends little by little as the motor ages.

Advantageously a reduced contact surface creates (during the running-in period of the motor) significant currents between the commutator and the brush. These currents accelerate the development of the patina. But it is said patina which contributes to reduce the motor noise. Moreover, a reduced contact surface diminishes the "arcing"-phenomena associated with aforementioned multiple commutation (mutual inductances).

The formed zones formed in both sides of the contact zone with commutator thus advantageously allow to accelerate the patina formation, to reduce the scattering of electromechanical performances, to reduce the vibratory/acoustic level and scattering, to reduce the electromagnetic phenomena (e.g. discharges), the thermal stresses being kept at their usual level, without additional costs (the formed zones are realized by moulding) and without significant modification of the required space of the brushes.

Naturally it is possible to grind ("in-situ" running-in) such brushes to form them being all complementary to the commutator plates which they are attached to. Said "in-situ" grinding, however, is a simple grinding which does not need any complex operation and which constitutes a simple refinement of pairing between the brushes and the commutator.

Moreover, other objects, characteristics and advantages of the present invention will become clear from the description which is now given, by way of example and not of limitation, with reference to the accompanying drawings, wherein

BRIEF DESCRIPTION OF THE DRAWINGS

FIG. 5 is a schematic perspective view of the brush according to the invention; and FIG. 6 is a graph representing the evolution of the polar covering of a brush according to the invention as a function of the brush length;

FIG. 7 is a schematic view similar to FIG. 2 showing an alternative embodiment with formed zones comprising radii of curvature; and FIGS. 8*a* and 8*b* are schematic views similar to FIG. 2 showing another alternative realization at a single formed zone.

DETAILED DESCRIPTION

Figure 1:
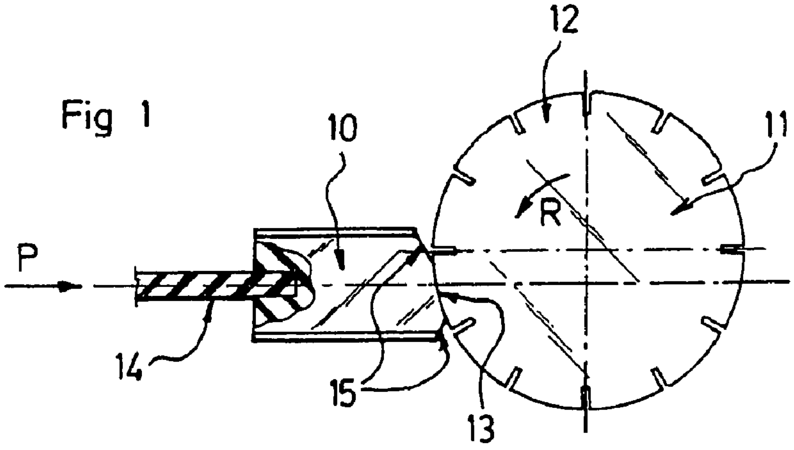
FIG. 1 is a schematic sectional view illustrating a brush according to the invention being in contact with a commutator.
Figure 2:
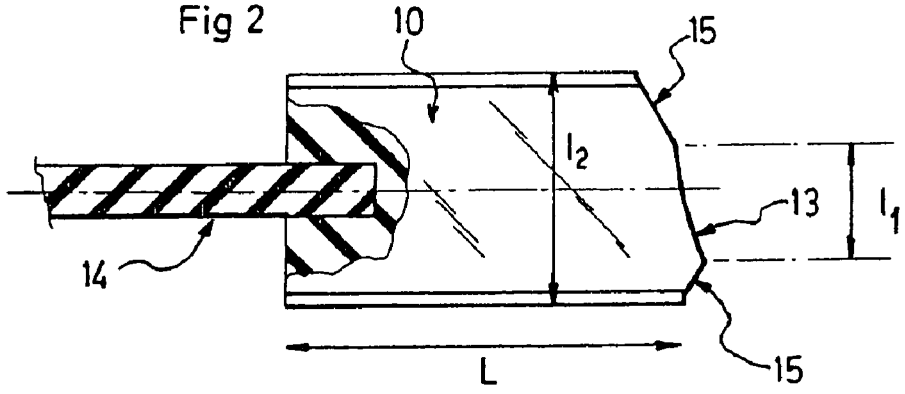
FIG. 2 is a view similar to FIG. 1 showing a detailed geometry of the brush according to the invention.

According to the embodiment showed in FIGS. 1 to 5, the brush 10 according to the invention is adapted for an initial contact with a commutator 11.

Actually, the commutator 11 of an electric motor (not shown) is rotated (arrow R—FIG. 1—) together with the part being rotor of said electric motor. This commutator is equipped with a plurality of conductive plates 12 along its periphery. Said plates (12 pcs. in the shown example) are better visible in FIGS. 3 and 4.

The brushes 10 are associated with the part being stator. In a well known manner the brushes are made of graphite (along with a certain percentage of copper and other additives), and besides they are fluently called "carbons" as well.

To maintain a continuous contact zone 13 between the commutator plates 12 and the brushes 10, the brushes 10 have to be push against the commutator 11 by a sufficient pressure P, in order to transmit an electric current between said two elements. If the contact is not sufficient, there is a risk of sparks. On the contrary, if the contact is too strong, the mechanical losses increase as well as temperature and wear and tear. To this purpose the brushes 10 are arranged in brush holders (not shown) in a usual manner, the brush holders being provided with resilient means (not shown) adapted to push the brushes against the commutator (arrow P—FIG. 1—). During the motor operation the brushes are abraded. In the shown example the brushes have an initial length L of approximately 14 mm. They are considered run down, if the dimension is about 6 mm and the supply line 14 is almost in contact with the commutator 11.

It should be noted that, according to the present invention, the position of the average contact point between the brush and the commutator keeps being stable during the whole motor operation resp. lifespan (i.e. after run down brushes as well). Therefore the angle of electrical commutation and the rotational speed of the motor keep being stable as well during the whole motor lifespan. It should be noted as well that, according to the present invention, the average contact point between the brush and the commutator is centred in reference to the brush surface being in contact with the commutator.

It is well known that electric motors have a first period of operation, the so-called initial condition or running-in period, during which a progressive running-in takes place as well as a patina deposition on the commutator. Said first period takes (in the example given) some hundreds or so hours. The motors then have a second period (very long—several thousands of hours), which is called stabilized function or operational condition. During this stabilized operational condition the brushes wear on a regular basis, but at a reduced rate, and the patina is well formed and permits gliding with an optimal friction between the brushes and the commutator. Further on a third period follows up, the so-called end-of-life, during which the wear-out of the brushes causes the supply lines 14 to contact the commutator. Then the brushes have to be changed.

According to the invention the brush 10 is provided with a control means of the brush polar covering between the running-in period and the stabilized operational condition of the motor.

The brush according to the invention generally has the shape of parallelepiped (FIG. 5) essentially comprising graphite. According to the invention two formed zones 15 (in the shown example the zones are chamfered zones) are formed at both sides of the contact zone 13 with the commutator (see also FIG. 2).

Advantageously said two chamfered zones are made by graphite moulding during manufacturing the brush. Therefore it is not necessary to machine the graphite brush to form them. Such achievement by moulding permits an easy and fast realization of said chamfered zones, and particularly without real additional costs.

Figure 3:
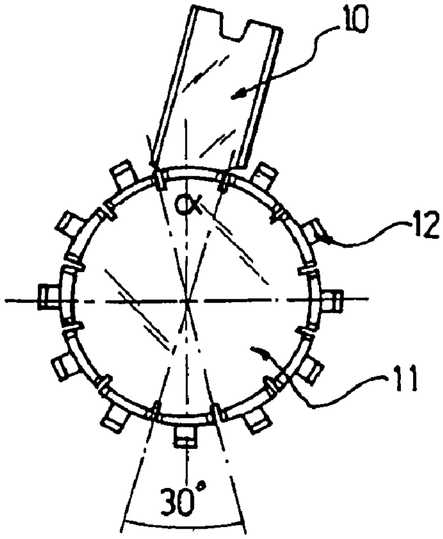
FIG. 3 is a schematic sectional view representing a brush according to the invention at the initial condition of the motor, the brush covering two commutator plates.
Figure 4:
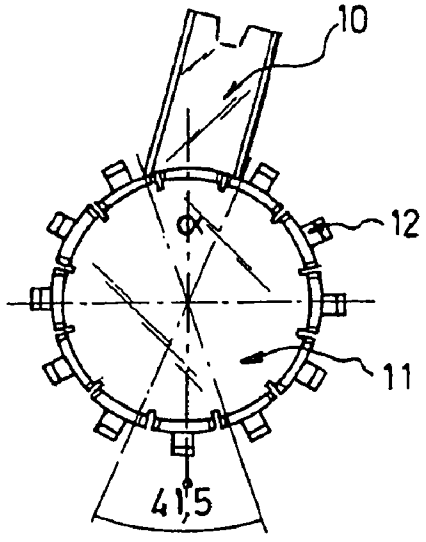
FIG. 4 is a schematic sectional view showing a brush according to the invention during stabilized operation of the motor, the brush covering now three commutator plates.

It is notably apparent from FIGS. 3 and 4 that the chamfered zones 15 constitute a polar covering control means of the brush. In FIG. 3 the motor is in its initial condition and the brush presents the aforementioned shape and therefore provided with two chamfered zones. Thus the width $\mathbf{1}_1$ (FIG. 2) of the zone being in contact with the commutator is smaller than the width $\mathbf{1}_2$ of the brush.

It is obvious from FIG. 3 that the brush covers two commutator plates. The reason to cover only two plates during the running-in period is to accelerate patina formation, to reduce (even suppress) the effects of electrical commutation associated with mutual inductances and thus to reduce the operational noise.

When the motor enters its stabilized operational condition (FIG. 4), a portion of the brush length L is used up. Therefore the width of the zone being in contact with the commutator then becomes $\mathbf{1}_2$. It should be noted that (FIG. 4) the brush covers three commutator plates.

It should be noted that, when the brush covers two commutator plates, its polar resp. central angle $\alpha$ is approximately 360°/P=30° (P=number of commutator plates, P=12 in the shown example), and if the brush covers three commutator plates, its polar angle becomes approximately 41.5° (in the shown example). On the contrary the average contact point between the brush and the commutator keeps being centred on the brush surface being in contact with the commutator and does not vary due to the brush wear and tear.

Thus, between the running-in period of the motor (FIG. 3) and the stabilized operational condition (FIG. 4) by playing resp. running on the width ($\mathbf{1}_1$; $\mathbf{1}_2$) of the zone being in contact with the commutator, it is possible to vary the polar angle of the brush. Therefore it is possible to utilize the advantages of a reduced polar angle during the running-in period (accelerated patina formation, thus fewer vibrations, thus less noise) without the long-term drawbacks of this type of polar angle. Actually, a long-term polar angle exceeding 41.5° permits the brush to cover three plates. During stabilized operational condition the advantages of this configuration (less noise, good patina, less wear and tear) can be fully utilized.

The invention thus concerns differently controlling the polar angle of the brush due to the lifespan of the motor. To this end it is sufficient to vary the brush width ($\mathbf{1}_1$; $\mathbf{1}_2$) during the whole motor operation.

In the example given the variation of the brush width is progressive (due to two chamfered zones 15).

In an alternative embodiment it would be possible as well to have a variation of the brush width by realizing no formed chamfered zone but a formed zone comprising a shoulder. However, such a shoulder implicates the disadvantage of being manufactured at least partly by machining, which complicates the fabrication of the brush.

In another alternative as well the formed zone (or the formed zones) can comprise more than one shoulder or more than one chamfer on each one of the sides of the contact zone 13.

In another alternative embodiment the formed zone can comprise radii of curvature and can be realized on both sides of the contact zone or on a single one of these sides (see FIG. 7).

In still another alternative (FIGS. 8*a* and 8*b*) the formed zone 15 can be realized on a single one of the sides of the contact zone 13 and not on both sides of said zone.

FIG. 6 particularly illustrates the variation of the brush polar angle due to the wear and tear of said brush, which means as a function of the motor lifespan. The ordinate (FIG. 6) refers to the polar angle in degrees (also called polar covering) and the abscissa refers to the brush length L.

The brush being released from moulding has a value of its length (L) of essentially 14 mm (in the shown example). Its polar covering angle is approximately 25°. A first “in-situ” lapping resp. running-in (i.e. grinding of the brush to get the exact shape of the commutator with which it will be associated) reduces the brush length to 13.6 mm. At this time the polar covering angle of the brush adds up to approximately 30°. At this level of finishing the motor will be put into operation (initial condition).

After some hundreds or so of hours of operation it can be seen that the brush has been worn to a length L in the range of 12.7 mm and to a polar angle of approximately 41.5° (i.e. more than 30°). Then the motor enters its stabilized operational condition. It is obvious from FIG. 6 that the brush progressively continues to wear away L=12.6 mm . . . 12.2 mm . . . , but on the contrary the polar angle keeps being essentially above 41.5° and does not change. This is simply due to the fact that the width $\mathbf{1}_2$ of the brush has been reached. As said width does not vary any more, the polar angle does not change any more as well.

Thus FIG. 6 illustrates how the variation of the width 1 of the brush permits varying the polar angle. By controlling the brush width the polar covering of the brush can be controlled as well.

The controlling of the polar covering of the brush due to the motor lifespan always permits an ideal placement within the configurations by limiting the motor noise principally during the whole passage through the running-in period of the motor until the stabilized operational condition has been reached. This as well permits choosing the polar angle of the brush due to the brush lifespan by realizing a brush having a width adapted to the wanted polar angle.

By varying the inclines of the chamfered zones 15 (shown here in the range of 60°), the operational duration on two or three commutator plates can be extended.

It should be noted that a chamfer having an incline of 60° moreover provides the advantage of being easy realized by moulding.

As a matter of course, the invention is not limited to the example of the embodiment described above. In particular, the given numerical values of the length L, the width 1 and the polar angle α are given by way of illustrative example only and not of limitation.

The invention claimed is:

1. A brush (10) adapted to come into contact with conductive plates (12) arranged on a commutator (11) of an electric motor, the brush comprising a polar covering control means (15) between the beginning of the motor lifespan and its condition of stabilized operation, the control means comprising a contact zone (13) disposed between first and second formed zones (15), at least a portion of the contact zone centered with respect to the brush for contacting the commutator plates (12), and the said formed zones being adapted to reduce the polar covering (α) of the brush to values lower than 360°/P, with P being the number of commutator plates, in the beginning of the motor lifespan, and to maintain a polar covering at values above 360°/P during a stabilized operational condition of the motor, wherein the brush contacts two commutator plates in the beginning of the lifespan, and the brush contacts three commutator plates during the stabilized operational condition.

2. The brush according to claim 1, characterized in that the first and second formed zones (15) comprise radii of curvature formed in both sides of the contact zone (13) with the commutator plates.

3. The brush according to any of the claim 1, wherein the formed zones are formed directly by moulding the material constituting the brush.

4. A brush (10) adapted to come into contact with conductive plates (12) arranged on a commutator (11) of an electric motor, the brush comprising a polar covering control (15) between the beginning of the motor lifespan and its condition of stabilized operation, the control comprising a contact zone (13) disposed between first and second formed zones (15), at least a portion of the contact zone centered with respect to the brush for contacting the commutator plates (12), and the said formed zones being adapted to reduce the polar covering (α) of the brush to values lower than 360°/P, with P being the number of commutator plates, in the beginning of the motor lifespan, and to maintain a polar covering at values above 360°/P during a stabilized operational condition of the motor, wherein the brush contacts two commutator plates in the beginning of the lifespan, and the brush contacts three commutator plates during the stabilized operational condition.

5. The brush according to claim 4, wherein the first and second formed zones comprise radii of curvature formed in both sides of the contact zone.

6. The brush according to claim 4, wherein the first and second formed zones are formed directly by moulding the material constituting the brush.

* * * * *